Feb. 9, 1943.    D. E. BATESOLE    2,310,607
RUBBER BONDED SPLIT METAL WASHER SEAL
Filed June 11, 1941    2 Sheets-Sheet 1
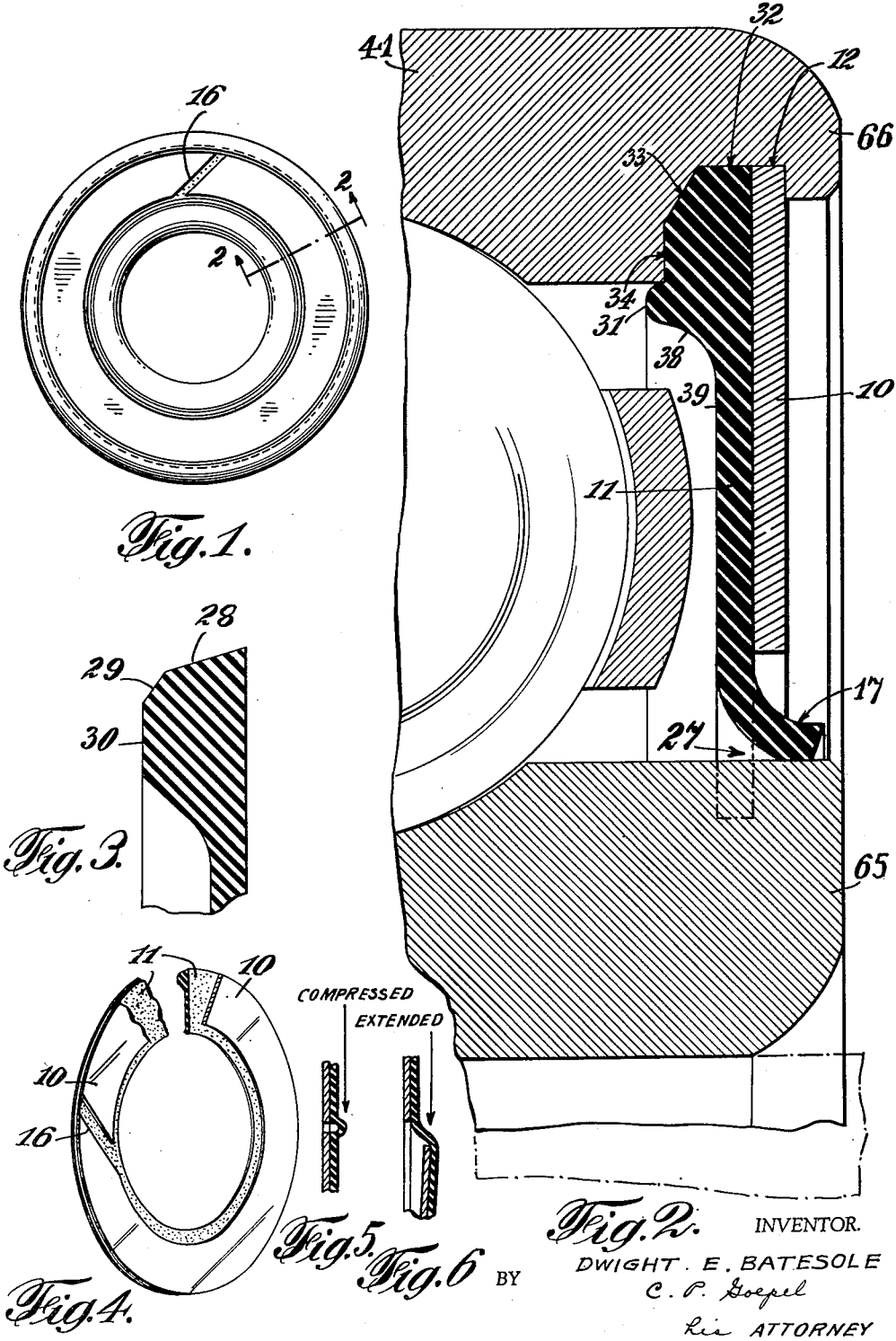
INVENTOR.
DWIGHT. E. BATESOLE
ATTORNEY Feb. 9, 1943.    D. E. BATESOLE    2,310,607
RUBBER BONDED SPLIT METAL WASHER SEAL
Filed June 11, 1941    2 Sheets-Sheet 2

INVENTOR.
BY DWIGHT E. BATESOLE
C. P. Goepel
his ATTORNEY

Patented Feb. 9, 1943

2,310,607

UNITED STATES PATENT OFFICE 2,310,607

RUBBER BONDED SPLIT METAL WASHER SEAL

Dwight E. Batesole, Glenbrook, Conn., assignor to Norma-Hoffmann Bearing Corporation, Stamford, Conn., a corporation of New York Application June 11, 1941, Serial No. 397,559

2 Claims. (Cl. 286—5)

This invention relates to lubricant seals for anti-friction bearings.

The object of my invention is to provide a lubricant seal that can be readily and conveniently applied in a bearing and retain oil and grease at the moving parts and keep dust and dirt therefrom. Moreover, the object is to provide a seal which will not interfere with the free operation of the parts composing the bearing.

Heretofore, in the use of seals of the kind described relatively rigid members were used as parts of the seals and in consequence they had a braking or dampening effect upon the movements of the parts. With rolling members disposed between racerings, one of which is applied to a shaft which has its own inherent movements, it will be seen that the racerings have movements in varying directions and vary in intensities. These movements are characteristic of the assemblage of such mechanical parts, and if disturbed set up resultant movements sometimes contrary to the natural functioning of the parts, and thereby disturb the intended equilibrium of the forces forming the basis of the design of the bearing.

The improved seal is based upon the concept that the parts of the bearing shall work out their own law of action with the attendant movements described, without such movements being influenced or modified by the application of the seal. In other words, though a seal is applied to a bearing with all the attendant advantages of retaining the oil or grease within the bearing and keeping dust and dirt out of the bearing, in respect to its inherent movements, the bearing acts as if the seal was not present at all.

For this purpose, the improved seal is so constructed as to yield and give in almost every direction; the constituent parts of the seal giving in respect to each other, the seal being wafer-like to enable the membranes of the same to give in response to the movements of the bearing parts. To provide such a wafer-like seal the membraneous parts thereof are made as thin as possible.

The invention consists of a wafer-like seal of a split metallic disc and rubber disc bonded thereto, with the rubber layer having an overlap to seal the seal to the moving racering to the extent of preventing passage therethrough of lubricant in one direction and dust in the other direction, this overlap having an inherent resiliency to enable the seal lap to take up any movement of the bearing parts, without resisting the same, with the body of the seal itself partaking in certain of such movements, if necessary.

The frictional resistance of any bearing is multiplied by the number of bearings in a mechanism, and such a factor may be one determining life or death, for example, in aviation. In the use of bearings at 30,000 feet altitude, the lubricant congeals due to the low temperatures of some minus forty degrees Fahrenheit. This congealing increases the friction factor and if there be added such a factor, a further factor due to the action of the seal upon the movements of the parts, then these combined factors may be sufficient to lock the bearings and make the plane inoperative.

In connection with the attaching of the wafer-like seal to the bearing, the rubber wafer functions to tend to tighten the clamping of the metallic disc into the outer ring groove, in that it tends to bring the metallic wafer back into its initial expanded position. Furthermore, the metallic disc coacts upon the rubber wafer to stretch the same upon the insertion or removal of the seal from the bearing, and such a stretching brings the metallic disc back to its initial position when distorted, angularly and circumferentially considered. The securing of the two together enables the coaction of the respective functions to produce a resultant of the two functions.

The invention will be further described, as embodiment thereof shown in the drawings, and the invention will be finally pointed out in the claims.

In the accompanying drawings,

Figure 1 is a side view of a bearing, having the improved seal applied thereto;

Figure 2 is a vertical radial section of a single row ball bearing, showing a partial view, with the improved seal applied thereto;

Figure 3 is a radial section of the enlargement of the rubber layer showing its initial position before being compressed by insertion, such as shown in Fig. 2;

Figure 4 is a perspective view of the improved seal partly broken away;

Figure 5 is a detail view of a part of the seal with the rubber compressed at the split of the metallic disc;

Figure 6 is a detail view of a part of the seal, showing the rubber in the split of the metallic disc extended;

Similar characters of reference indicate corresponding parts.

Figures 7, 8:
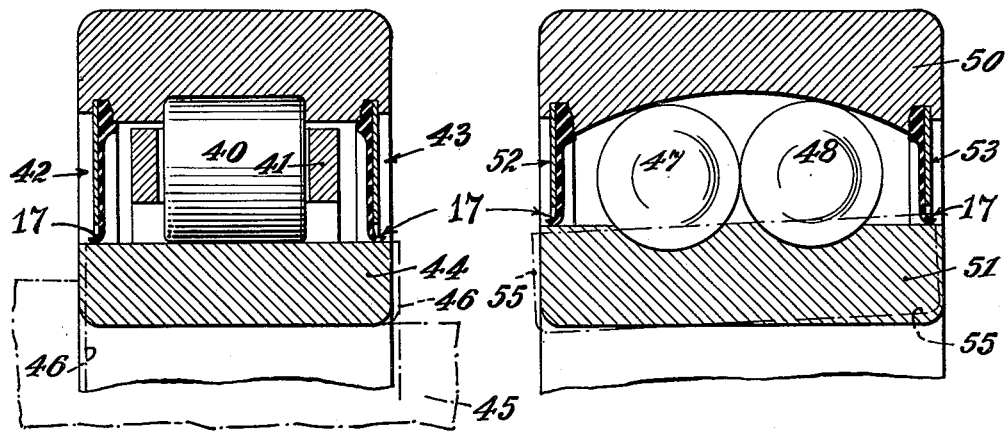
Figure 7 is a vertical radial section of a roller bearing, showing a partial view, with the improved seal applied thereto, indicating also a lateral vibration or movement of the inner race.
Figure 8 is a vertical radial section of a self-aligning ball bearing with the improved seal applied thereto, indicating also vibrations or movements of the inner racering.

Referring to the drawings, and more particularly Figure 2, there is there shown a wafer-like seal, which consists of two layers or discs, a metallic disc 10 and a rubber disc 11. It will be seen that both discs are relatively thin so as to form membrance-like discs, and that the thickness of one layer is approximately the thickness of the other layer. The preferred thickness of each layer is .015 to .031", the thickness being progressively larger as the external diameter of the washer increases. The outer diameter of the seal is determined by the inner surface of the outer racering, that is by the part extending beyond the race, plus the depth of the necessary cutout in the outer racering to provide a seat 12 for the outer peripheral margin of the seal. The inner diameter of the metallic washer is determined by that of the inner surface or land of the inner racering, that is, by the part extending beyond the raceway, plus a distance to separate the metallic disc from the land of the inner racering. The rubber disc has the same outer diameter as that of the metallic disc. The inner diameter of the rubber disc is less than that of the inner racering. The rubber layer extends beyond the inner bore edge of the metallic washer to permit the overlap of the rubber layer to be disposed between the inner circumferential margin of the metallic disc and the racering. The metallic disc 10 is split, or provided with a cutout, as shown by 16, which is an open slit diagonal to the radial line. The washer is originally an annulus. A part is cut away and removed to provide the cutout or slit 16. This permits the washer to be compressed to reduce its outer dimension for insertion in a receiving groove of a racering. The slit is reduced when the seal is being applied to a bearing.

The rubber disc is bonded to the split metallic disc by vulcanizing or other suitable means, in such a way that the two discs are substantially one layer, and so that the movement of one disc partakes of the movement of the other. For instance, during the application of the seal to a bearing, the slit is closed, or almost closed, to enable the seal to be applied to the bearing since the diameter of the bore of the bearing is less than the outer diameter of the wafer-like seal, and due to the close fitting and bonding action of rubber to metal, that portion of the rubber disc normally closing the slit is moved into a compressed condition as shown in Fig. 5. The outer dimension of the washer is thereby reduced to permit its insertion in the receiving groove of the racering. A preferred method of inserting the wafer is to insert one end of the metallic washer into the receiving groove and to keep pushing the washer into the groove until the entire washer has been inserted. During the insertion, the rubber extends, as is shown in Fig. 6. Thus the rubber disc normally bridging the slot of the metal disc, either compresses or extends in respect to its normal position. Such an action of compression and extension takes place not alone during the application and disengagement of the seal to the racering but while the bearing is in operation. The metallic disc, though rigidly held at its peripheral portion, is not rigid to the movement of the bearing parts, but is sufficiently yieldable to bend slightly whereby the metallic disc closes and opens the slit. The very thin rubber disc partakes of such movements of the metal disc, and does not resist the same in any substantial amount.

The rubber disc extends beyond the inner margin to form an overlap 17. This extension is about equal to 4½ times the thickness of the rubber disc. The length of the overhang beyond the plane of the free side of the racering 65 is about 1½ the thickness of the rubber disc. When the extension overlaps, the space between the curvature of the overlap over the metal disc permits free movement of the overlap to a considerable extent, in that it acts in the nature of a spring. Should it be pressed beyond a certain amount it will exert a force upon the metallic disc which is desired to be avoided by this improvement. The curvature of this extension, as shown in the drawings, is such that the inherent resiliency of the extension is such that a pressure of the extension is exerted which prevents the passage of dust and lubricant, but is not sufficient to exert a substantial braking effect upon the land of the racering.

It is to be particularly noted that the thinness of the metal disc and rubber disc produce the result of having these layers act as a membrane enabling it to absorb or coact with all of the various movements of the parts of the bearings, without restricting such movements in any substantial manner.

The overlap 17 has a spring-like pressure due to its positioning upon the racering surface and such a pressure as to prevent lubricant or dirt from passing between the overlap and the ring. There is a capillary attraction at the point indicated at 27, due to the curvature and flat surface merging into a tapering form of a gap. This has a tendency to draw into this space a film of lubricant particularly under the movements previously described, which helps to lubricate the seal at its contact with the inner racering. The pressure is such that dust cannot pass therethrough from outwards to inwards.

Having described the inner marginal circumferences, the larger peripheral margin of the rubber is extended to larger portion, and has an inclined surface 28, then a second inclined surface 29, and then a radial surface 30, as shown in Fig. 3. The outer racering is provided with a flat surface 32, an inclined surface 33, and a radial surface 34. The shape thus described of the rubber in its initial shape is then pressed or compressed into the shape or recess of the cavity just described, and takes the ring cavity shape. This compressed enlargement of the rubber presses upon the sides of the cavity with the metal disc pressing against the opposite wall of the recess, thereby retaining a secure hold of the peripheral margin of the seal to one race ring. Circumferential bead 31 results from the rubber being assembled into position. After assembly into the bearing there results a curved surface or fillet 38 from the bead 31 to the outer free radial plane surface of the rubber layer, whereby the major portion of the rubber disc is permitted to yield or move in respect to the enlargement, the adjacent portion acting somewhat like a hinge.

The enlargement of the rubber is necessary to seal the bearing effectively at that point and to tightly hold the wafer-like seal within the recess. A seal with such thin layers without the enlargement would not hold itself in the recess. Obviously the wafer-like thin rubber without such an enlargement would not have sufficient compressibility to insure that such a thin rubber layer would contact the recess wall with sufficient pressure to seal against leakage at the outer ring.

In Figures 5 and 6 are shown sections of the seal to illustrate the distortion of the metallic and rubber discs at the beginning of the operation of removing the seal from the bearing. The insertion of the wafer has been described. To remove the wafer, one end of a tool such as a screw driver is inserted into the receiving groove and against one end of the washer. This is pressed radially inwards to remove it from the racering groove, and the tool is moved along the perimeter of the washer in a direction away from the slit. In the completion of the circumferential movement of the tool, between the racering and washer, the washer with the rubber layer is entirely removed from the receiving groove. During this action, the rubber is stretched as shown in Figure 6. The rubber may be also compressed at times as shown in Figure 5. The same distortion may take place in assembling the seal when one end of the washer with the rubber layer attached thereto is inserted into the groove at the start of the operation, when stretching first takes place, then compression, and when the balance of the seal is then forced into the receiving groove, the washer exerts its inherent pressure radially outwards at points circumferentially around the seal.

In Figure 7 a similar type seal is shown in a cylindrical roller bearing. Such bearings are usually mounted in a "floating" position, in other words, the inner ring may move endwise with shaft expansion or when the shaft is oscillated. The seals do not restrict such a movement in any substantial manner (as shown by dotted lines) due to the wafer-like construction and with the low pressure factor of the extended lip of the rubber layer.

The roller 40 with its cage 41 is shown, and two seals 42 and 43 are shown, constructed in the manner described. The inner race 44 is secured to a shaft 45, and the shaft 45 vibrates longitudinally as shown by the dotted line 46.

In Figure 8 is a bearing of the self-aligning type, having two rows of balls 47 and 48, held by the outer racering 50, and the inner ring 51, and with two improved seals, one 52 at one side, and one 53 at the other side of the balls. The inner racering 51 moves from its full line position to its dotted line position 55 and return under conditions of misalignment.

Figure 9:
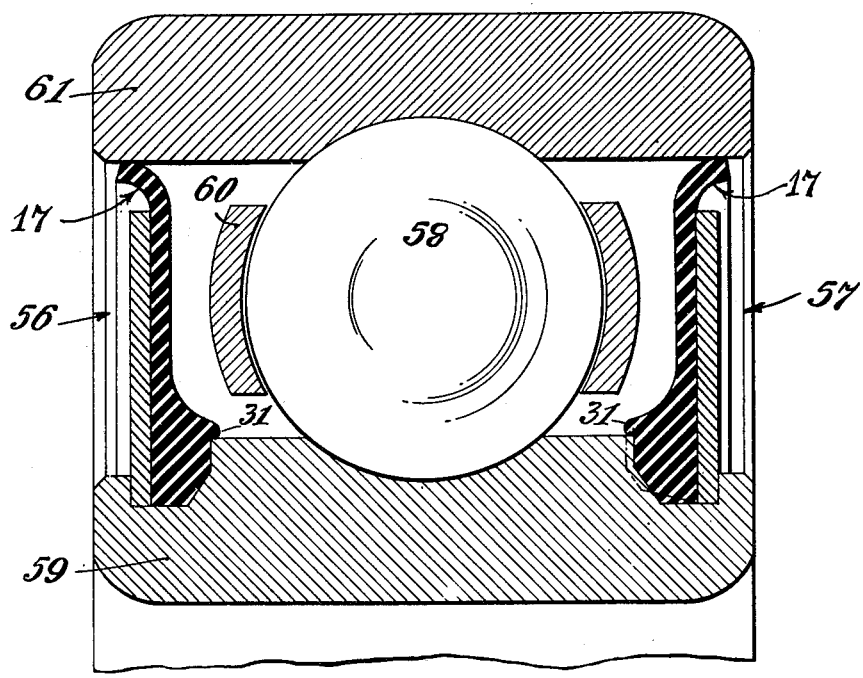
Figure 9 is a similar section but with the seal reversed with the rubbing contact on the outer instead of the inner racering.

In Fig. 9, the same type of ballbearing is shown as in Fig. 2, but the seals 56 and 57, one at each side of the balls 58, are secured to the inner racering 59 in the same manner shown in Fig. 2. The cage 60 and outer racering 61 are of the usual construction. In the right hand side of the inner racering 59, in dotted lines, is shown the rubber enlargement in its initial construction before being pressed into the recess of the race, by which compression the bead 31 is formed.

I claim:

1. A seal for bearings having inner and outer concentric members, one of which has an annular groove with an inclined wall and the other has a land extending axially beyond said groove, one of said members being rotatably movable in respect to the other, comprising a rubber disc extending from one member to the other in a plane substantially perpendicular to the axis of said members, said rubber disc having an enlargement at one radial end and at one side thereof to engage the groove and press against the inclined wall to seal the groove against the passage of fluid between the grooved member and the enlargement, said rubber disc being flat on the other side and having a yieldable lip at its other radial end adapted to yieldably engage the land of the other concentric member when curved towards the outer end of the land, and a metal disc having one of its faces bonded along its entire face to the flat face of said rubber disc and its outer radial end adapted to engage said groove adjacent the flat side of the rubber disc, and having its inner radial end so spaced from the land member to hold the adjacent radial end of the rubber disc in curved shape under tension below said inner radial end and yieldably against said land to give a light pressure action sufficient to prevent a lubricant from passing between it and the land, but insufficient to exert a substantial braking effect upon the land, the bonded rubber disc beyond the enlargement having a wafer-like thinness and having its unbonded face free and unrestricted to permit a flow of the rubber from the enlargement when drawn upon by the metal disc pressing on the curved end.

2. A seal for bearings having inner and outer concentric members, one of which has an annular groove with an inclined wall and the other has a land extending axially beyond said groove, one of said members being rotatably movable in respect to the other, comprising a rubber disc extending from one member to the other in a plane substantially perpendicular to the axis of said members, said rubber disc having an enlargement at one radial end and at one side thereof to engage the groove and press against the inclined wall to seal the groove against the passage of fluid between the grooved member and the enlargement, said rubber disc being flat on the other side and having a yieldable lip at its other radial end adapted to yieldably engage the land of the other concentric member when curved towards the outer end of the land, and a metal disc having a cutout extending from its inner to its outer circumference and having one of its faces bonded along its entire face to the flat face of said rubber disc and its outer radial end adapted to engage said groove adjacent the flat side of the rubber disc, and have its inner radial end so spaced from the land member to hold the adjacent radial end of the rubber disc in curved shape under tension below said inner radial end and yieldably against said land to give a light pressure action sufficient to prevent a lubricant from passing between it and the land, but insufficient to exert a substantial braking effect upon the land, the bonded rubber disc beyond the enlargement having a wafer-like thinness and having its unbonded face free and unrestricted to permit a flow of the rubber from the enlargement when drawn upon by the metal disc pressing on the curved end, the thinness of the rubber disc enabling the two discs to yield membrane-like transversely to the plane of the disc and radially due to the cutout in the metallic disc, the rubber layer partaking of all movements of the metallic disc, with that part of the rubber disc over the cutout of the metallic disc stretching or contracting with the increase or decrease of the space of the cutout.

DWIGHT E. BATESOLE.